(No Model.)

A. GUNDERSON.
APPARATUS FOR REELING AND UNREELING BARBED FENCE WIRE.

No. 283,884. Patented Aug. 28, 1883.

Attest:
F. W. Howard
L. F. Gardner

Inventor:
Albert Gunderson
By Parker H. Sweet Jr. atty

UNITED STATES PATENT OFFICE.

ALBERT GUNDERSON, OF SHABBONA, ASSIGNOR TO A. M. MUNSON, OF LEE, ILLINOIS.

APPARATUS FOR REELING AND UNREELING BARBED FENCE-WIRE.

SPECIFICATION forming part of Letters Patent No. 283,884, dated August 28, 1883.

Application filed April 3, 1882. (No model.)

*To all whom it may concern:*

Be it known that I, ALBERT GUNDERSON, a citizen of the United States, residing at Shabbona, in the county of De Kalb and State of Illinois, have invented certain new and useful Improvements in Apparatus for Reeling and Unreeling Barbed Fence-Wire; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has for its object to provide an apparatus of a novel and simplified construction for reeling and unreeling barbed fence-wire in the quickest and best possible manner; and it consists, essentially, of an open rectangular frame mounted upon an axle between two vehicle-wheels, and provided at one end with a revolving shaft adapted to receive the spool or reel of fence-wire, and which has motion imparted to it through the medium of friction-rollers upon the ends of the revolving shaft, which impinge against the surface of the vehicle-wheels, all as will be hereinafter more fully described, and specifically designated in the claim.

Figure 1:
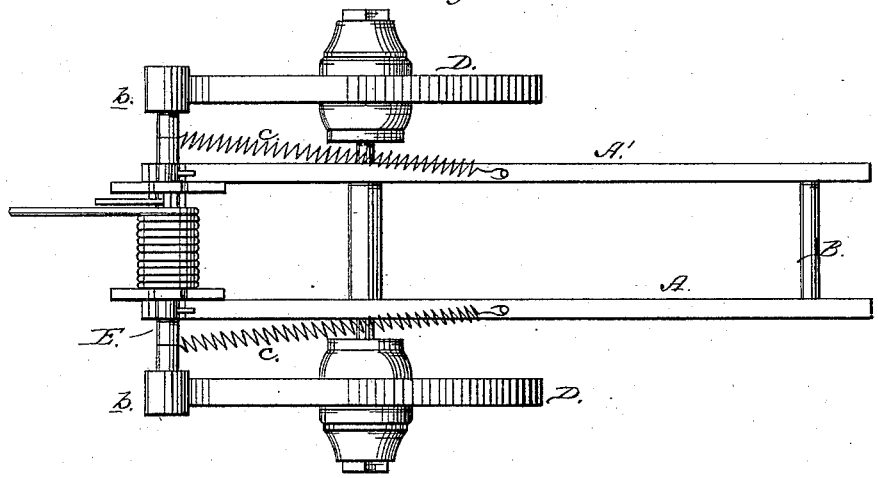
Figure 2:
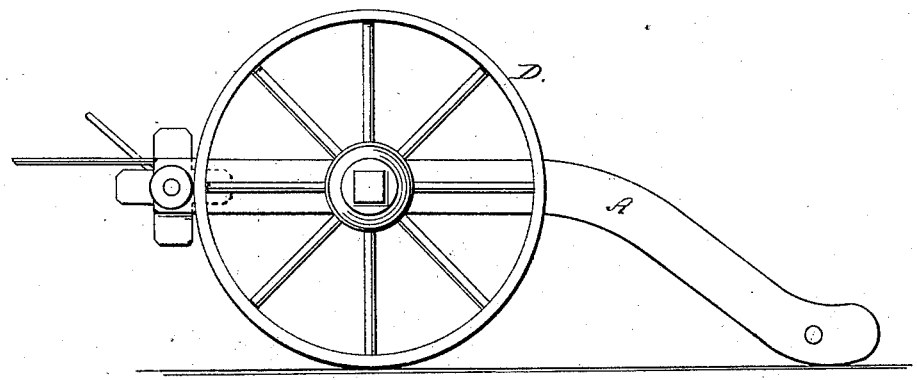
Figure 3:
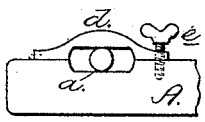

In the accompanying drawings, Figure 1 represents a top view of my improvements; Fig. 2, a side elevation of the same, and Fig. 3 a detail view.

Similar letters of reference occurring on the several figures indicate corresponding parts.

In carrying out my invention the open rectangular frame is composed of the two side bars, A A', and end braces, B, which is mounted upon the axle C, and provided with the vehicle-wheels D, as shown. The front end of the said frame is provided with a revolving shaft, E, which has its bearings in the side bars, A A', in such a manner that the ordinary spool or reel of fence-wire can be readily slipped thereon or removed at pleasure. The front ends of the side bars, A A', are slotted to receive the ends of the revolving shaft E, and upon each projecting end of the said shaft are provided friction-rollers $b$, removably affixed thereto, which impinge or bear against the rim of each of the vehicle-wheels D to revolve the said shaft, the friction-rollers being held against the vehicle-wheels by coiled springs $c$, arranged upon each side, as fully shown in the drawings. The ends of the revolving shaft E rest in the slotted bearings $a$ in the side bars, A A', and are removably held therein by means of the hinged and overlapping saddle $d$ and thumb-screw $e$, as fully shown in Fig. 3.

The construction of my invention being as described, it will be observed that in the operation of the same and when it is desired to lay and stretch the fence-wire, the spool or reel containing the same is placed upon the shaft E, and the one end of the wire being secured to the first post, the apparatus is moved along the line of posts, causing the shaft E to revolve and uncoil the desired quantity of the fence-wire. In rewinding or coiling the wire upon the reel the thumb-screws $e$ are removed and the saddle $d$ thrown back, allowing the shaft E to be removed from its bearings and turned over or reversed, so that the free end of the wire will be under instead of over the reel, which is then again replaced in its bearings and secured by the saddle and thumb-screw. Now, by moving the apparatus along in the direction of the first post the wire is rewound upon the reel in a smooth and easy manner.

By means of my improvements barb-wire fences can be put up with great rapidity and as readily taken down and recoiled upon the spool or reel when it is desired to dip the same in tar or paint or to renew the barbs thereon.

As a means of causing the quantity of the wire as unreeled to approximately accord with the distance which the wheels D travel, the greatest diameter of the reel of wire, when fully reeled, is not permitted to exceed the diameter of the friction-rollers $b$, connecting the revolving shaft E with the vehicle-wheels D. I do not limit myself as to the proportionate dimensions shown of the wheels D, friction-rollers $b$, nor of the revolving shaft whereon the wire is wound, and more or less slack wire is necessarily allowed preliminary to the reeling or unreeling process.

Having thus described my invention, what I claim as new and useful, is—

As an improved article of manufacture, the herein-described apparatus for reeling and unreeling barb fence-wire, consisting of the rectangular frame mounted upon the axle C and wheels D, and provided with the revolving shaft E, adapted to be operated by the friction-rollers $b$ and springs $c$, all substantially as and for the purpose specified.

In testimony whereof I affix my signature in presence of two witnesses.

ALBERT GUNDERSON.

Witnesses:
C. W. HUBBELL,
FRED D. KELLEY.